Fig. 3.

S. B. AUSTIN.
ADDING MACHINE.
APPLICATION FILED JAN. 29, 1913.

1,188,878. Patented June 27, 1916.
6 SHEETS—SHEET 4.

Inventor:
Sydney B. Austin,
by Spear, Middleton, Donaldson & Spear
Attys.

Attest:
Ewd L. Jolson
C E Parsons

S. B. AUSTIN.
ADDING MACHINE.
APPLICATION FILED JAN. 29, 1913.

1,188,878.

Patented June 27, 1916.
6 SHEETS—SHEET 5.

Attest:
Ewd L. Tolson
C. E. Parsons

Inventor:
Sydney B. Austin,
by Spear, Middleton, Donaldson & Spear
Attys.

S. B. AUSTIN.
ADDING MACHINE.
APPLICATION FILED JAN. 29, 1913.

1,188,878.

Patented June 27, 1916.
6 SHEETS—SHEET 6.

Attest:
Ewd L. Tolson
R. E. Durand

Inventor:
Sydney B. Austin,
by Spear, Middleton, Donaldson & Spear
Attys.

UNITED STATES PATENT OFFICE.

SYDNEY B. AUSTIN, OF BALTIMORE, MARYLAND, ASSIGNOR, BY MESNE ASSIGNMENTS, TO FREDERIC L. HUIDEKOPER, TRUSTEE, OF WASHINGTON, DISTRICT OF COLUMBIA.

ADDING-MACHINE.

1,188,878.  Specification of Letters Patent.  Patented June 27, 1916.

Application filed January 29, 1913. Serial No. 744,981.

*To all whom it may concern:*

Be it known that I, SYDNEY B. AUSTIN, citizen of the United States, residing at Baltimore, Maryland, have invented certain new and useful Improvements in Adding-Machines, of which the following is a specification.

The invention relates to that type of adding machine in which only ten keys are employed and a group of toothed rotary selectors or transmitting gears are employed, upon which the values of the keys depressed are first set up, the said selectors or transmitting gears as a group being moved leftward, as the keys are struck, to get into operative relation to the accumulator trains and it is characterized by employing a series of check disks geared to the selectors or transmitting gears and moving therewith as a body, these check disks displaying the digits corresponding to the keys depressed at a display opening so that the accuracy of the operator's selection of keys can be at once checked up before the values selected are thrown into the accumulator, the check disks being returned to zero when the values have been transmitted to the accumulator.

Further the invention is characterized by carrying mechanism for the accumulator which will secure a positive action and eliminate all danger of overthrow.

Further it is characterized by means for locking the handle against improper movement, and means for locking the keys, except when the handle is at the rearmost limit of its movement, and means whereby the width of the machine is reduced to a minimum.

In the drawings Fig. 7ª is a diagrammatic plan view.

The toothed selectors 1 are mounted to turn on a shaft 2 journaled in the frame and they are turned to different degrees, according to the value of the keys operated, by a spline bar 3 carried by arms 4 fixed to the shaft 2. The shaft and arms are rotated by a link 5 from an arm 5' on a shaft 6 which is rotated by pins 7 on the key levers 8 engaging cams 8' on the shaft 6, the relation of the cams and pins being such that the cam shaft will be rotated through greater or lesser arcs according to the value of the keys operated.

Figure 3:
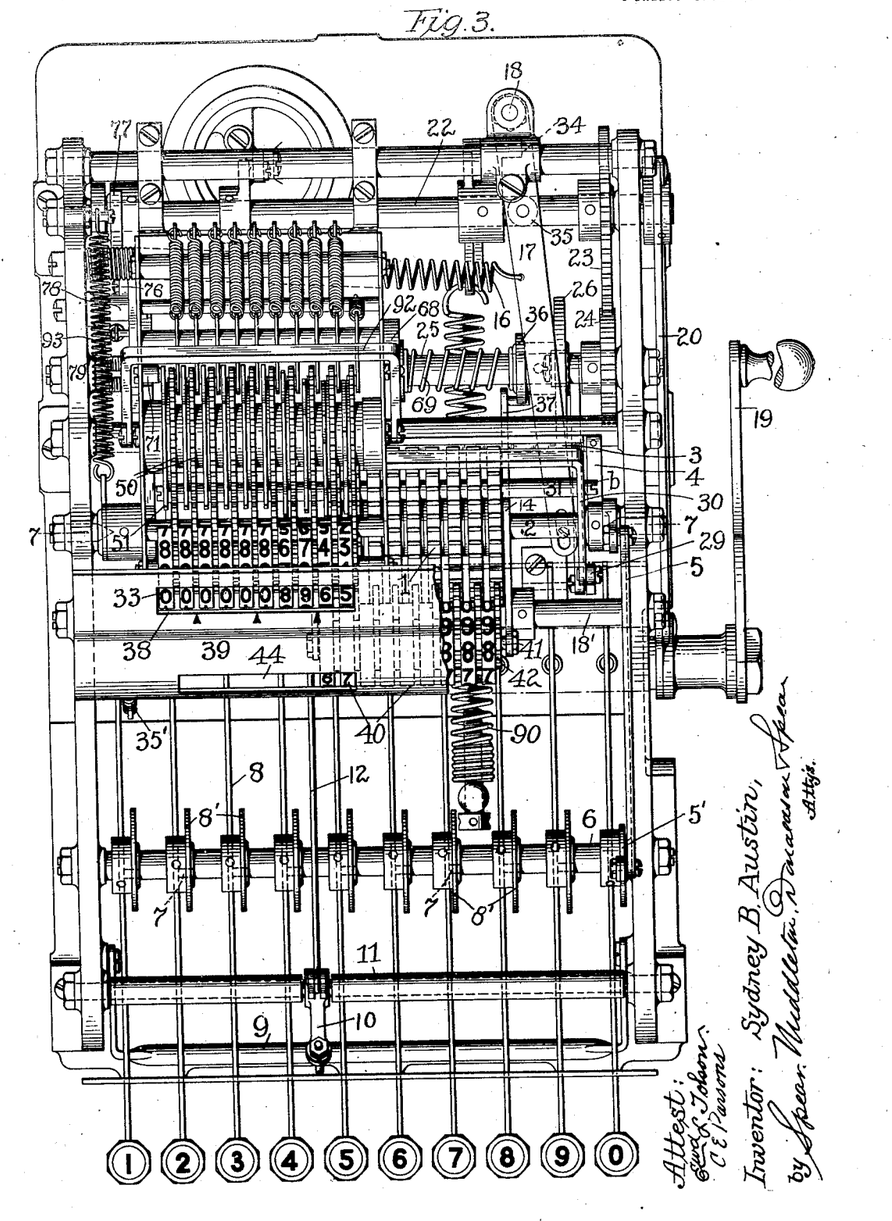
Fig. 3 is a plan view of the machine.
Figure 7:
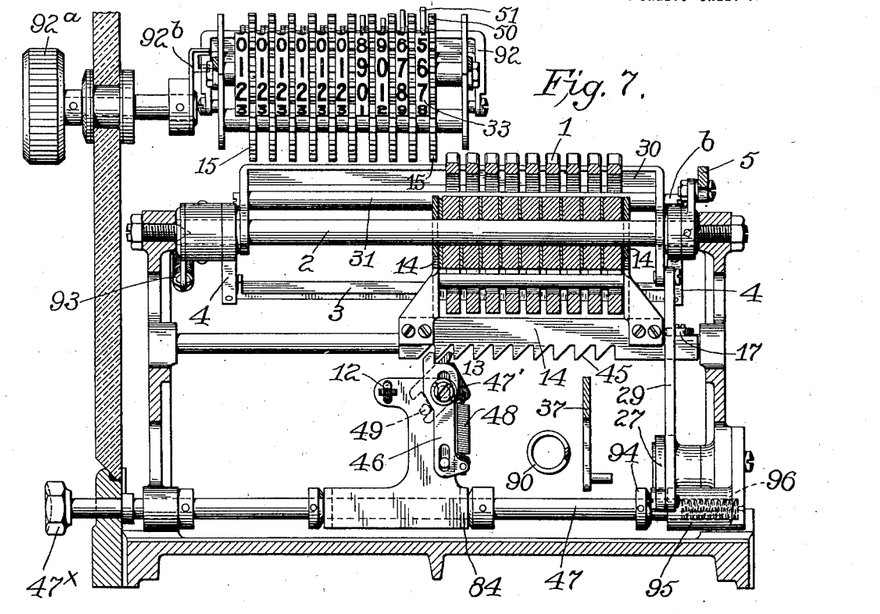
Fig. 7 is a cross sectional view substantially on the line 7—7 of Fig. 3.
Figure 7A:
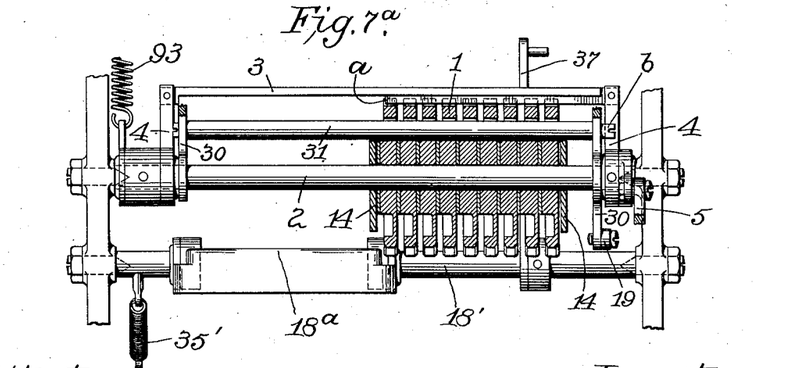

Normally the group of selector segments will be located at the right of the machine, as shown in Fig. 7. Supposing the 6 key, Fig. 3, is depressed, the connections just described will rotate the whole group of selectors through an angle corresponding to the value of the 6 key, and as the key lever is completing its downward stroke it operates a space bar 9 which, through an arm 10 on rock shaft 11 and a link 12, operates the escapement at 13 so that the carriage 14, the arms of which embrace the group of selectors, will be moved leftward one step to make the selector 1, at the left of the group which has been advanced or turned, leave the spline bar at point a, Fig. 7ª, to be thus independent of the group and while still advanced engage with the first one of the toothed wheels 15 of the accumulator mechanism counting from the right of Fig. 7. This leftward movement of the selector carriage 14, when released by the escapement mechanism, is due to a lever 17 pivoted at 18 and pressed by a spring 16. When the 6 key is released, all the selectors excepting the one which has passed off from the spline bar are rotated back to initial position. If now the 7 key is pressed the selectors as a group, excepting that one at the extreme left which has engaged the first gear of the accumulator mechanism, will be rotated to a position corresponding to the value of this key 7 and in the final downward movement of the 7 key lever, the escapement 13 will again be operated and the selector carriage 14 will move another step leftward, carrying the selector which had previously engaged the first gear of the accumulator out of engagement therewith and into engagement with the second toothed wheel 15 and carrying the next selector into engagement with the first gear 15. This next or second selector will now be free from the spline bar and the rest of the group. As the selectors move leftward, as just described, their teeth engage a detent bar 18ª mounted on a shaft 18' journaled in the frame, said detent serving to hold the selectors against displacement during their period of transition into engagement with the gears of the accumulator mechanism and after they leave the end *a* of the spline bar. When the 7. key is released all the selectors excepting the two which have moved off of the spline bar are rotated back to initial position.

We will assume that the number 67 is to be added, and the keys are pressed in order, reading from the left of the number, as above described *i. e.*, first the 6 key and then the 7 key. We now have the two selectors, at the left of the group, turned or set up through degrees corresponding to the 6 and 7 keys and engaged with the first two gears 15 of the accumulator, and with number 67 showing on item wheels 40 at slot 44. Now to throw these values into the accumulator, a handle 19 is drawn forward which, through a link 20, arm 21, shaft 22, segmental gears 23, 24, shaft 25, cam 26 on said shaft, lever 27 pivoted at 28, link 29, operates a frame 30 turnable about shaft 2. This frame carries a return bar 31 which extends through openings in the selectors. When the frame 30 is swung against the tension of its return spring 30', the return bar moves rearwardly and downwardly and comes against the wall 32 of the selectors and rotates them rearwardly to zero position and thus those selectors which have been set up and are in engagement with the gears 15 of the accumulator trains will turn said gears through angles corresponding to the values of the keys operated *i. e.*, 6 and 7 teeth in this instance, and this action will throw these values into the accumulator which will show on the register disks 33 of the accumulator. Of course, when the operation first begins, supposing the register wheels are at zero, the number 67 will show on the first two register disks. When another number is added the sum will show at the register disks. After the number has been thrown into the accumulator by the return of the selectors, as just stated, the whole group of selectors are moved back to their disengaged position at the right of the machine. This is done in the final part of the forward movement of the handle 19 by a cam 34 on the shaft 22, operating against a roller 35 on the lever 17.

Before the selectors can be rotated backwardly, as above described, to throw the values from the selectors into the accumulator, it is necessary to withdraw the detent bar 18 from engagement with the toothed selectors and this is done as soon as the handle 19 begins its forward movement by a spring 35' which turns the shaft 18'. The detent bar is returned and held into engagement with the selectors on the backward movement of the handle by a cam 36 on the shaft 25, acting against a pin 37' on an arm 37 fixed on the detent shaft 18'.

Figure 1:
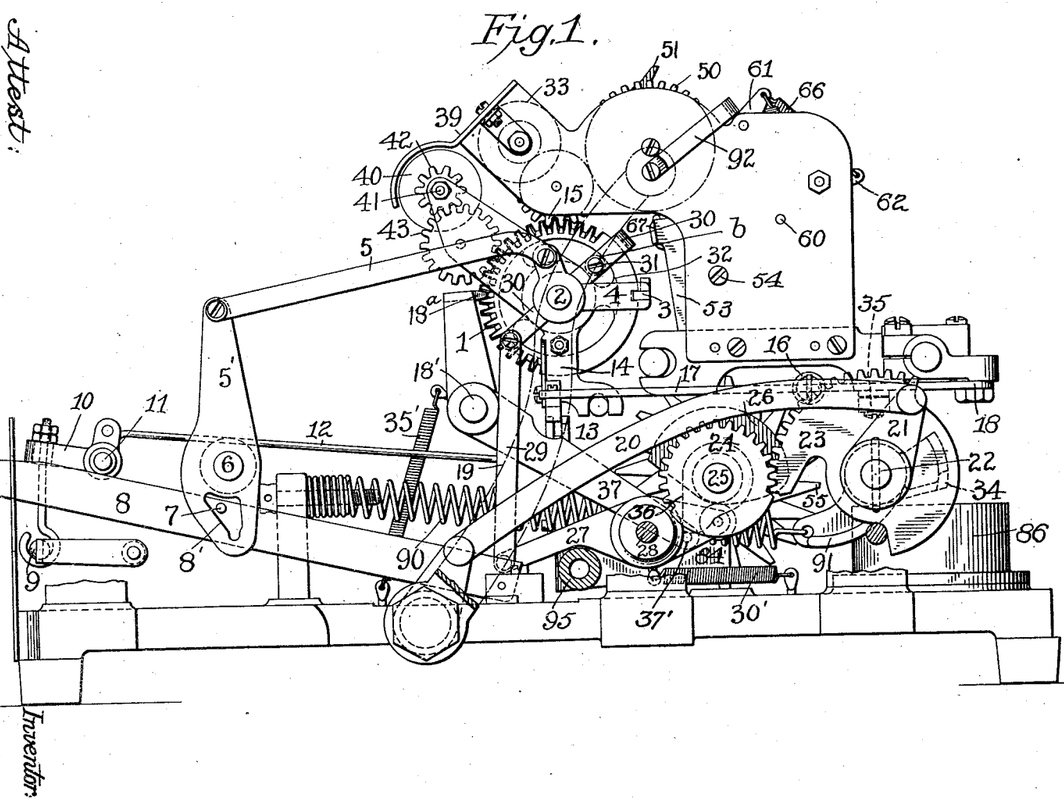
Figure 1 is a side view with frame parts omitted.

Means are provided to line up the spline bar 3 with the notch in those selectors which became free therefrom in the setting up action. This lining up action must take place before the group of selectors is returned to the right to their disengaged position so that those selectors which were disengaged from the spline bar will reëngage the same. For this purpose I may rely on the frame 30 striking the spline bar on its rearward or downward stroke to bring its spline in line with the notches in the selector, or a stud or screw *b* on the frame 30 may be used to strike the arm 4 of the spline bar and move it into proper position, Figs. 1 and 3.

The group of selectors are loosely mounted in the frame by shaft 2 which can turn in said frame, and the selectors are loose on this shaft. As a group their exact position circumferentially before the setting up action begins is not important for the reason that the operation of any key will, by means of its cam 8', and the spline bar 3, secure an accurate setting up action of the selectors. There may be a certain amount of play between the pin 7 and the edge of the cam 8', giving rise to this preliminary inexact position, but as just stated, accurate setting up action will result when the pin 7 contacts with the cam.

The sum of the values thrown into the accumulator will show on the register disks through a slot 38 in a shield 39. In order to show the number which has been set up corresponding to the keys operated so that the operator may check up the accuracy of his selection and operation of the keys, I employ a series of check disks 40 turnable on a rod 41 supported in the arms of the selector carriage, said disks each being numbered from 0 to 9, and each being geared through the toothed wheels 42, 43 with the toothed selectors so that as any selector is set up its corresponding check disk will be turned to bring the digit corresponding to that of the key depressed at the display line. As all the check disks with their gears move axially with the selectors and maintain their connection therewith, these digits will be displayed at the slot 44 in the shield 39 and the operator may at once see if he has pressed the right keys, the number displayed at the slot 44 being, if the proper keys were depressed, that which is to be thrown into the accumulator. When the handle 19 is moved forward to throw the values, shown at slot 44, into the accumulator mechanism, the selectors are returned to zero and the check disks on which these values are displayed will also be rotated back to zero and then all these disks will be moved to the right under the unslotted part of the shield because they will all move with the selector carriage when this is moved back to the right of the machine. In this way after each operation of setting up the digits of the number and throwing them into the accumulator, the check slot 44 is left entirely free and clear.

The escapement for the selector carriage may be of various forms. As shown herein it consists of a rack bar 45 on the selector carriage engaged by an escapement dog 46 on the arm 13 turnable on a rod 47, said arm being operated by the link 12. The arm also has a pivoted detent 47′ under tension of a spring 48 and limited in its movement by stop 49. This escapement works substantially like a typewriter escapement and needs no particular description.

*Accumulator mechanism.*—This mechanism includes the register or number disks 33 and the toothed wheels 15 above mentioned and also carrying mechanism which includes toothed carrying wheels 50 one for each register disk, these wheels 50 meshing with the transmitting gears 15. These carrying gears have each a series of carrying points or arms 51 fixed thereon. There is a carrying pawl 52 for each carrying train mounted on setting plates 53 pivoted on a rod 54. These setting plates are adapted to be operated by arms 55 of a drum 56 operated in the direction of the arrow, Figs. 2, 8, and 9, each time the handle 19 is moved backward. Each carrying pawl is connected to its setting plate by pin and slot connections at 57, 58, and each pawl has a slot 59 through which a frame bar 60 extends. There is a detent 61 for each carrying wheel 50 pivotally mounted on the frame and there is a detent 62 for each carrying pawl. Each pawl detent is pivotally mounted on the frame and each has a pin 63 to engage either one of two notches 64, 65 of each carrying pawl. I employ three carrying points 51 on each carrying wheel 50, these being 10 teeth apart so that one third revolution of the carrying wheel represents one complete revolution of its corresponding number disk. Springs 66 press the detents to their work.

Figure 2:
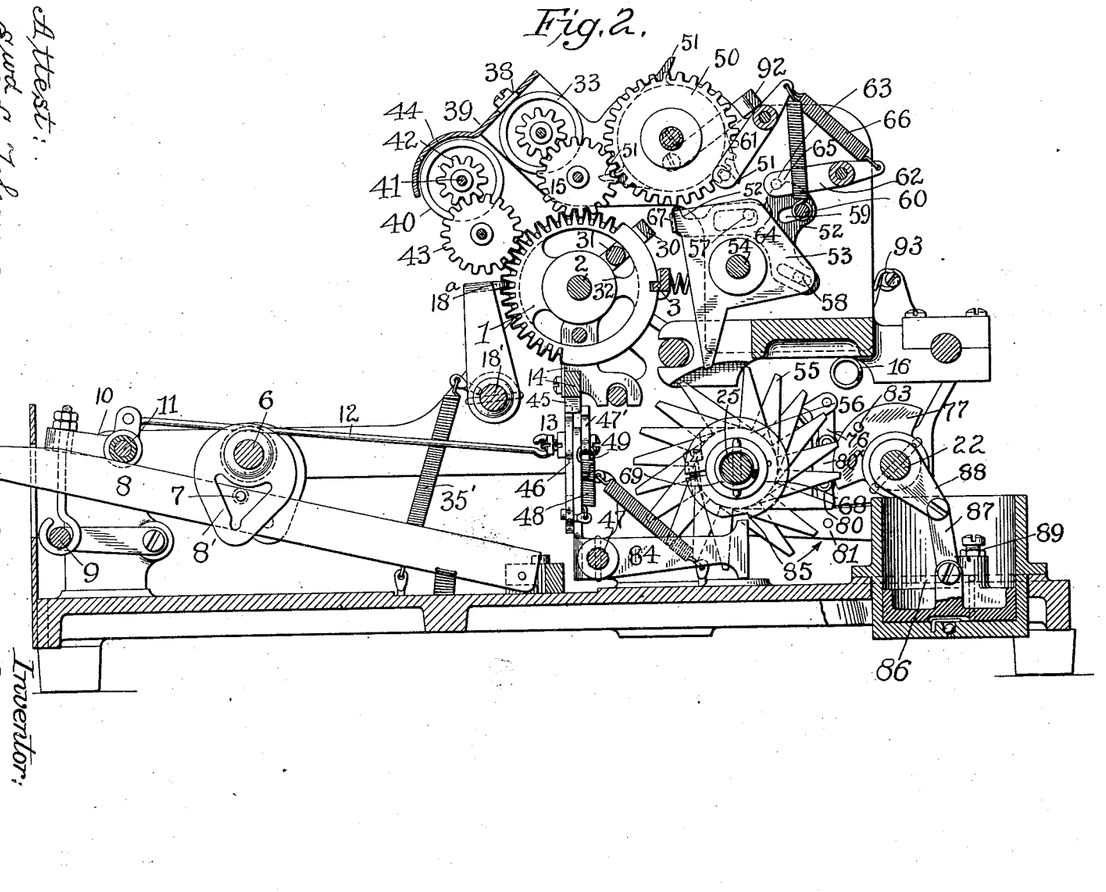
Fig. 2 is a vertical sectional view from front to rear.
Figure 8:
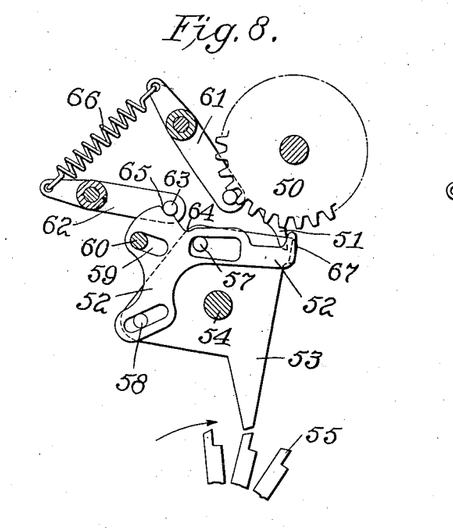
Figs. 8, 9, 10, 11 are views of the accumulator mechanism in different positions.
Figure 9:
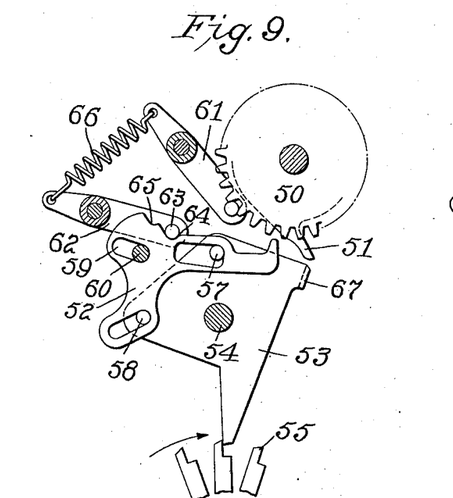
Figure 10:
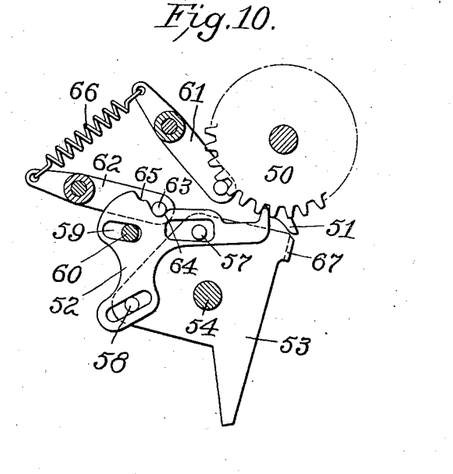

The action is as follows: Figs. 2 and 8 show the normal position of the parts. As any one of the number wheels, say the units wheel, changes from 9 to 0, one of the carrying points 51 of the carrying wheel belonging to this number wheel will strike the lug 67 of the setting plate belonging to the carrying wheel of the next higher order, namely the tens, and will move it forward from the position shown in Fig. 8 to the position shown in Fig. 9. The pin 58 moving in the slot in the pawl 52 on this setting plate moves the pawl backward to the position shown in Fig. 9 (the set up position) where it is held by the detent 62 engaging the notch 64. This movement is substantially a sliding one, for while the slot 59 and that containing the pin 58 are inclined in respect to each other, the movement of the pin 58 is toward the fixed pin 60 during the tilting action of the carrier plate 53 just described. This backward movement of the pawl is due to the camming action of the pin 58 in its slot, and to the fact that the pin 60 acts as a fixed guide. When the drum 56 rotates, due to the backward movement of the handle, as will be hereinafter described, one of the arms or pins 55 thereof will strike the lower end of the setting plate which has been set as just described and move it from the position of Fig. 9. The pawl 52 is at first held from forward movement by the resistance of the detent 62 so that turning on the detent pin 63 as a pivot the pawl will rise into engagement with the carrying gear 50 of the tens train, as shown in Fig. 10. This pivotal movement of the pawl is due to the conjoint action of the pin 63 acting as a pivot, and the pin 58 working in its slot from the position shown in Fig. 9 downwardly to the position shown in Fig. 10 owing to the pivotal swing of the carrier plate 53 under the action of the pin 55.

Figure 11:
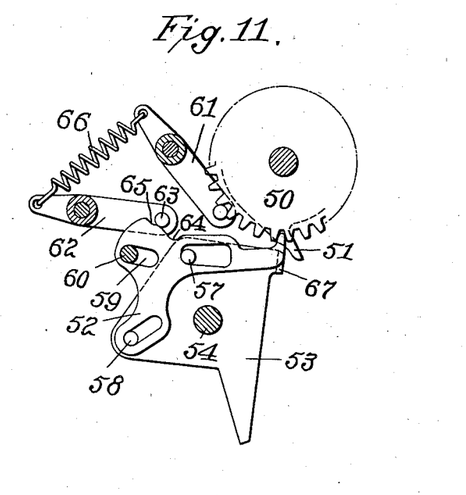

Further movement of the pawl carrier or setting plate 53 under the action of the pin drum now causes the pawl 52 to turn the carrying gear forward one tooth from the position of Fig. 10 to that of Fig. 11, the detent pin 63 now partly engaging the upper notch 65 of the carrying pawl, as shown in the latter figure. The forward movement of the pawl for turning the carrying gear as just described is due to the pin 58 moving in a downward direction from the position Fig. 10 to that of Fig. 11, and exerting a camming action against the wall of its slot. At the extreme end of the motion of the setting plate or carrier 53 which is determined by the slots and pins, the relation of the slots and pins is such that the carrying pawl is held locked in the gear 50, thus preventing overthrow, Fig. 11. When the pin drum passes and releases the setting plate this drops back slightly allowing the carrier pawl to return to normal position, shown in Figs. 2 and 8, this dropping back of the setting plate or pawl carrier 53 with the pawl to normal position being due to gravity aided by the detent 62 under tension of its spring, for it will be noticed that in the position of the parts shown in Fig. 11 the detent pin 63 has not yet seated itself in the upper notch 65, the pin 55 of the pin drum not yet having freed the carrier or setting plate 53. When, however, the pin of the pin drum passes by the setting plate the spring 66 of the detent 62 exerting its force, will cause the detent pin 63 to press on the inclined wall of the notch 65 and thus return the pawl and pawl carrier to normal position of Fig. 2.

It will be seen from the above that the carrying pawl is positively stopped on its forward throw by the pin and slot and that it remains locked to the carrying gear until after it performs its full forward movement and not until then is it returned to normal position out of engagement with the carrying gear and then it is returned by the combined action of gravity and the force of the spring 66, acting through the detent pin and the inclined edge of upper notch 65.

Figures 4, 5, 6:
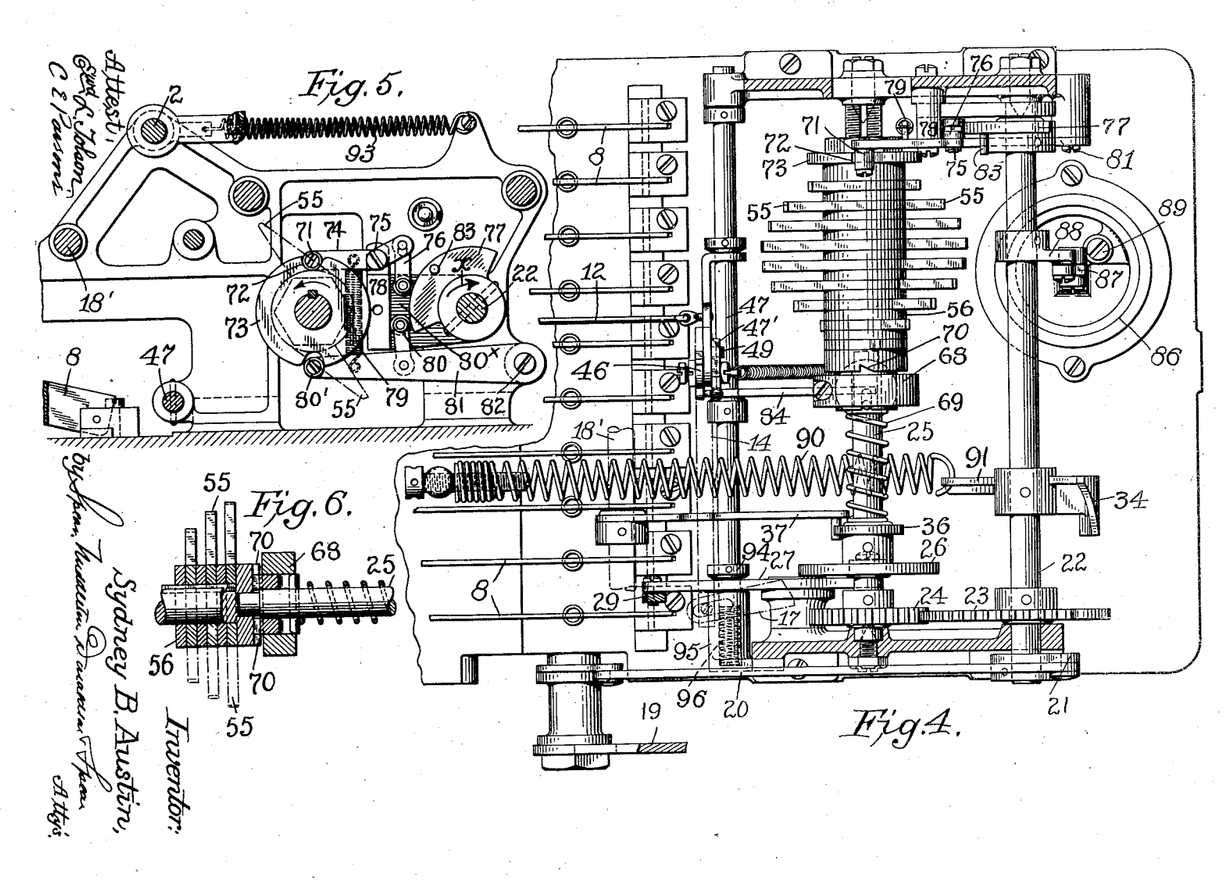
Fig. 4 is a plan view of part of the machine with the selectors and accumulator mechanism omitted.
Figs. 5 and 6 are views of details.

As above stated the pin drum 56 is rotated forwardly each time the handle goes back so that the carrying operation of the tens from order to order takes place on the backward movement of the hand lever 19. For this purpose the pin drum, as shown in Fig. 4, is operated by a clutch 68 splined on the shaft 25 and pressed by a spring 69 to make its teeth engage notches 70 in the drum arranged at diametrically opposite points so that the drum is turned one-half revolution for each backward stroke of the handle 19, said drum having two sets of spirally arranged arms or pins 55 thereon. When the handle 19 is moved forward the clutch disk rotates rearwardly, its teeth riding up on the inclines of the notch in the pin drum and pushing the disk along the shaft against the pressure of its spring. The pin drum is arrested against overthrow and held accurately in position by a detent 71 engaging at notch 72 in the flange 73 of the pin drum Figs. 4 and 5. This detent pin or roller is carried by a lever 74 pivoted to the frame at 75. A chock consisting of a link 76 loosely connected with the lever and having a pin or roller located between the edge of a segment 77 and the fixed bearing 78 on the frame, serves to lock the handle against forward movement during the time the handle is on its backward stroke so that having started to move back the handle can not be moved forward until after the backward stroke of the handle has been completed, for it will be noticed that when the handle is started back the revolution of the pin drum will lift the detent out of the notch and the chock pin or detent will be thrown down between the chock segment and the frame bearing. This will not prevent the backward movement of the handle because at this time the chock disk is rotating in the direction of the arrow $x$, Fig. 5, but should it be attempted to reverse the movement of the handle 19 at any point intermediate of its backward stroke, the chock disk will rotate in a direction opposite to that of the arrow $x$ and as the chock roller is still in its low position near the narrowest part of the chock recess $80^x$, owing to the detent riding on the high part of the flange 73, the chock roller will be jammed between the edge of the chock segment and the fixed bearing and forward movement of the hand lever will be prevented. It will be necessary therefore to move the hand lever all the way back before it can be started forward. When the hand lever reaches its rearmost position the detent 71 drops into the notch 72 of the pin drum and the chock link and pin are lifted under the pressure of the spring 79 so that the chock disk can rotate forwardly without interference on the part of the chock roller.

A chock is also provided to prevent backward movement of the hand lever from any point intermediate of its forward stroke so that it having started forward it must complete this movement before it can move back. For this purpose a second chock detent roller or pin 80 is used, carried on a lever 81 pivoted on the frame at 82. This lever has a pin or roller 80' to enter the notches 72 or to ride on the flange 73. During the forward movement of the handle the pin drum is at rest and the lower chock lever is elevated by the spring 79, the lower notch 72 allowing the lever to assume its elevated position under the tension of the spring 79. The chock segment 77 can rotate forwardly now without interference by the lower chock roller but if the hand lever should be started backward from any point intermediate of its forward stroke, the tendency of the chock segment to backward movement will jam the lower chock roller up into the narrowest part of the chock recess and thus against the fixed chock bearing on the frame, whereby backward movement will be prevented. When the handle moves rearwardly the lower chock is depressed by the lever 81, riding on the high part of the flange 73 so that now the backward movement of the chock segment can take place freely. A pin 83 on the chock segment, by coming against the lower chock lever 81, serves to hold it down until the high part of the flange 73 begins to act and hold the lower chock lever depressed.

In order to prevent the depression of any key lever except when the hand lever 19 is all the way back, i. e., in normal position a locking arm 84 extends from the escapement arm 13 under the clutch disk 68, which has a peripheral recess or notch 85 Fig. 2 to allow the end of the arm 84 to rise when any key is depressed, provided the clutch disk is in the position corresponding to the backward position of the handle. If the handle is moved forward, however, to any degree the plain periphery of the clutch disk will come over the end of the lever and prevent its upward movement which it must have in order to allow the depression of a key lever and thus the keys will be locked and the selector wheels can not be turned or the selector carriage can not be operated except when the hand lever stands at the limit of its rearward stroke.

A dash pot is provided at 86 to cushion the return stroke of the hand lever 19 and connected mechanism, the piston of this dash pot being connected to the rear shaft 22 by the link 87 and arm 88. An adjustable air valve may be employed at 89 on the piston. A spring 90 is preferably used to return the handle 19 and connected mechanism to rear position, the operator simply releasing the handle when drawn forward to allow it to go back by the force of this spring, which is connected to an arm 91 of the cam 34.

In order to return the carrying wheels 50 together with the register disks 33 to normal position a return frame 92 is used which is pivoted eccentrically of the group of carrying wheels, and operated through a knob 92$^a$ and fork 92$^b$.

While the selectors or transmitting gears 1 are shown herein as set up by certain connections leading back to the keys, the invention is not limited to this manner of setting up the transmitting gears or selectors into different angular positions as other means may be used for this purpose.

The employment of the two parallel shafts 22 and 25 at the rear of the machine geared together and carrying the various devices such as the cams, the chock disk, the pin drum clutch and the dash pot operating means keeps the width of the machine to the lowest possible limit.

A spring 93 serves to normally hold the group of selectors at approximately half way of their angular throw, and by this the key stroke is made more uniform, because otherwise, for instance, the depression of the 9 key would have to swing the group of selectors through the full arc belonging to that key whereas with the spring this normally positions the group of selectors at a point intermediate the length of said arc.

In order to eliminate errors, the rod 47 is moved to the right lengthwise by pressing a button 47$^x$ so that the escapement and the selector carriage 14 will be shifted to bring the selectors out of engagement with the accumulator gears and opposite the spaces between the said gears, so that by operating the handle any selectors which have been set up can be turned to zero position and then shifted to their disengaged position at the right without transferring erroneous values to the accumulator. The shifting movement of the rod is limited by the collar 94 striking a part 95 of the frame. A spring 96 returns the rod when pressure on the button is relieved. The notched edges of the carrying pawls constitute in effect cam portions against which the detents act to control the engagement of the pawls with the carrying wheels.

Having now described and ascertained the nature of my said invention, and in what manner the same is to be performed, I declare that what I claim is:—

1. In combination in an adding machine, accumulator mechanism, a group of rotary selectors, keys with connections for turning the selectors and setting them up in angular positions according to the values of the keys operated, means for rotating the selectors back to zero position to transfer the values onto the accumulator, and means for maintaining the selectors ready for operation by the key connections in an angular position intermediate of the arc of possible movement of the said selectors, substantially as described.

2. In combination in an adding machine, accumulator mechanism, a group of rotary selectors, key connections for rotating said selectors to angular positions according to the values of the keys operated, and yielding means for maintaining the group of selectors loosely to occupy normally an intermediate angular position ready to be operated by the key connections, substantially as described.

3. In an adding machine accumulator and in combination, number wheels, a series of toothed carrying wheels, carrying pawls for the said carrying wheels, pivotally mounted setting plates, means for slidably connecting the said pawls with the setting plates, means independent of the setting plates for tilting the pawls into engagement with the toothed carrying wheels when the setting plates are moved in one direction and for positively throwing said pawls out of engagement with the toothed carrying wheels when they have completed the turning movement of the carrying wheels, substantially as described.

4. In combination in accumulator mechanism, number disks, carrying gears having the carrying points or projections thereon, carrying pawls to engage and turn the carrying gears, setting plates pivotally mounted and having pin and slot connection with the pawls to permit them to slide and tilt in relation to the setting plate, a frame, a pin and slot connection between the pawls and the frame, and spring detents for tilting the pawls into engagement with the carrying gears and for throwing the pawls out of connection with said gears when the carrying movement is completed, substantially as described.

5. In combination in accumulator mechanism, number disks, carrying gears having the carrying points or projections thereon, carrying pawls to engage and turn the carrying gears, setting plates pivotally mounted and having pin and slot connection with the pawls to permit them to slide and tilt in relation to the setting plate, a frame, a pin and slot connection between the pawls and the frame, and spring detents for tilting the pawls into engagement with the carrying gears and for throwing the pawls out of connection with said gears when the carrying movement is completed, said pawls having two notches engaged by the detents in the different positions assumed by the latter, substantially as described.

6. In combination in accumulator mechanism, number wheels, carrying gears, pawls for engaging and operating said gears, setting plates pivotally mounted, and having pin and slot connection with the pawls, said pawls having cam portions, and means independent of the setting plate and the pins carried thereby engaging the cam portions of the pawls and controlling their engagement with the carrying gears, substantially as described.

7. In combination in an adding machine keys, accumulator mechanism, selector mechanism operated by the keys to set up values corresponding to the values of the operated keys, a handle with connections for operating the set-up selector mechanism to transfer the values therefrom to the accumulator mechanism, said connections including a member for locking the keys against operation excepting when the handle is in its rearward position, said member consisting of a rotating notched disk and an arm controlled thereby for locking the keys, substantially as described.

8. In combination in an adding machine, keys, accumulator mechanism, selector mechanism operated from the keys to set up values corresponding to the values of the keys operated, carrying mechanism for accumulator mechanism, a pin drum for operating the carrier mechanism, a handle with connections to the selector mechanism for transferring the values from said selector mechanism to the accumulator mechanism, a clutch between the handle and the pin drum for operating the latter in one direction, said clutch having a backward and forward movement with the handle, and a locking arm connected with the keys and controlled by the said clutch to lock the keys against operation except when the handle assumes a predetermined position, substantially as described.

9. An adding machine comprising an accumulator mechanism, rotary selectors, key connections for rotating the selectors, escapement mechanism for moving the selectors axially, carrying mechanism, a handle, connections for rotating the selectors to zero position to thereby transfer the values onto the accumulator mechanism, connections for returning the selectors axially to initial position, a pin drum for operating the carrying mechanism, a shaft carrying said pin drum, said shaft operating the said connections to rotate the selectors to zero position, a second shaft arranged parallel with and in rear of the shaft carrying the pin drum, said shaft operating the connections for returning the selectors axially to initial position, gearing between the said shafts, the said handle operating one of the shafts, substantially as described.

10. In combination in an adding machine, number disks, carrying mechanism, a pin drum for operating the carrying mechanism, a shaft, having rotary reciprocating movement, a clutch on said shaft for driving the pin drum forwardly in one direction step by step, a second shaft parallel with the first and also having rotary reciprocating movement, a handle to which said shafts are connected and from which they are oscillated and full stroke mechanism comprising a member on the second shaft oscillating therewith, detent or chocking members one for holding said members against movement in one direction and the other for holding said members against movement in the other direction, and a cam member moving with the pin drum and controlling both the detents to render them effective alternately, substantially as described.

In testimony whereof, I affix my signature in presence of two witnesses.

SYDNEY B. AUSTIN.

Witnesses:
H. P. Crook,
Chas. F. Fink.